July 13, 1926.

R. W. MARTIN 1,592,532

COMBINED LEVEL, PLUMB RULE, AND CLINOMETER

Filed Jan. 13, 1922

Inventor
Raymond W. Martin
his Attorneys

Patented July 13, 1926.

1,592,532

UNITED STATES PATENT OFFICE.

RAYMOND W. MARTIN, OF COLUMBUS, OHIO, ASSIGNOR TO GEORGE E. TIFFT, JR., OF COLUMBUS, OHIO.

COMBINED LEVEL, PLUMB RULE, AND CLINOMETER.

Application filed January 13, 1922. Serial No. 528,908.

The invention relates to instruments for ascertaining levels, verticals and inclinations, especially in building construction, its object generally being to provide an instrument with an improved gravity actuated pointer cooperating with a suitable dial, whereby such levels, verticals and inclinations can be ascertained with greater certainty then heretofore practical. The invention consists, generally, in providing for such an instrument a pointer with means whereby its larger and ordinary oscillations are supplemented by vibrations or agitations tending to dislodge the pointer from any incorrect position on its bearing and settle it in the correct position when the body of the instrument is brought to rest.

The invention is embodied in the example herein shown and described.

In the accompanying drawing illustrating one embodiment of the invention:—

Figure 1:
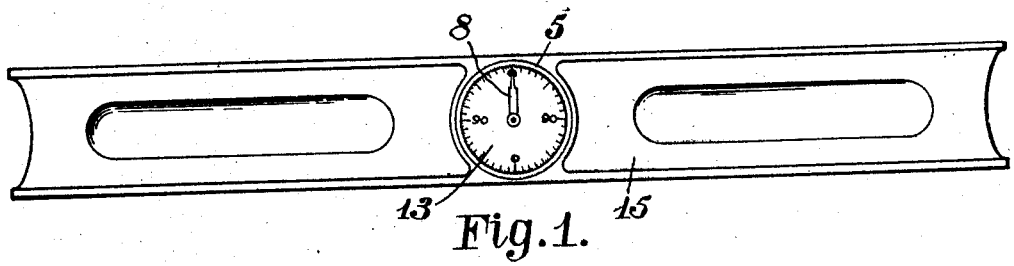
Figure 1 is a side view of the instrument containing the invention.
Figure 2:
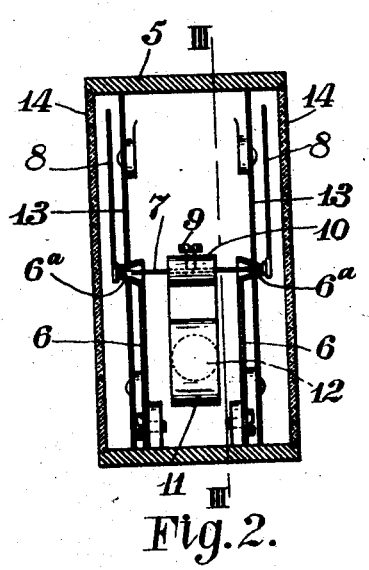
Fig. 2 is a central sectional view on a larger scale of the indicator on the line II—II Fig. 3, some parts being left in full.
Figure 3:
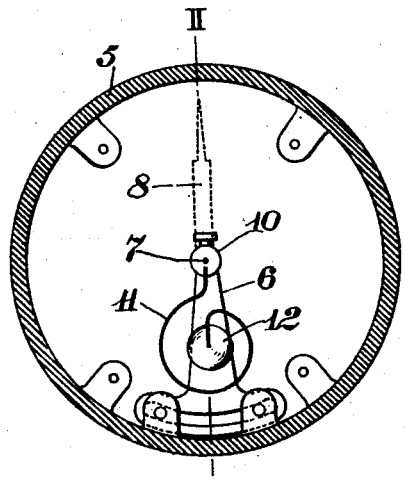
Fig. 3 is a section of the indicator on the line III—III Fig. 2.

In the views 5 designates a cylindrical housing to receive the indicator. Secured to suitable lugs on the interior of the housing are oppositely placed metal standards 6 having their free ends pressed or cut to form outwardly projecting bearings 6ª. The character 7 designates a shaft supported at its ends in the bearings 6ª and having hands or pointers 8 affixed to its opposite ends beyond said bearings. Adjustably affixed by means of a set screw 9 to the middle of the shaft 8 between said hands or pointers is a collar 10 having attached thereto one end of a thin volute spring 11, the other end of said spring being provided with a weight 12. The weight 12 and spring are sufficient to hold the pointers in vertical position or in any other position they may be set on their shaft. Because the spring is of thin flat metal as shown it is held to oscillate in a plane at right angles to the axis of motion of the pointer shaft. Because the collar 10 is adjustable axially the pointers can be made to stand in just the desired and proper direction.

Secured to suitable lugs on the interior of the case are dials 13 centrally perforated for the protrusion therethrough of the projecting bearings 6ª of the standards 6. From this construction it will be observed that the pointers are held amply removed from the outer or visible faces of the dials and that the weight actuating said pointers is concealed by the dials. The dials are preferably marked on their exposed faces in quadrants from zero to 90 degrees of a circle, the zeros being at the tops and bottoms of the dials and in a line at right angles to the straight edge of the level or rule so that angles with reference to the horizontal can be readily determined. The characters 14 designate disks of transparent material inserted in the end of the housing for covering the dials and excluding foreign particles. The housing thus constructed is shown as inserted and secured (see Fig. 1) in a suitable block or bar 15 having at least one straight edge with the line of the zeros at right angles to such edge.

The forms of the parts can be changed without departing from the gist of the invention as claimed.

What I claim is:—

In an instrument for ascertaining levels, verticals and inclinations, the combination of a scale, a shaft having a pointer member thereon cooperating with the scale, bearings for the shaft, and a resilient pendant portion rigidly connected at one end with the shaft consisting of a spring of thin voluted flat metal having the plane of its width extending parallel to the axis of said shaft and a weight at its other or free end, said pendant portion extending from said shaft in a direction opposite that in which said pointer member extends and said spring limiting the oscillation of the pendant to a plane at right angles to the axis of the shaft.

RAYMOND W. MARTIN.